Patented Dec. 2, 1947

2,431,980

UNITED STATES PATENT OFFICE 2,431,980

GLASS HAVING LOW POWER FACTOR

William H. Armistead, Jr., Corning, N. Y., assignor to Corning Glass Works, Corning, N. Y., a corporation of New York No Drawing. Application October 11, 1944,
Serial No. 558,278

10 Claims. (Cl. 106—53)

This invention relates to glass compositions and has for its primary object to provide new and useful glasses having certain special characteristics making them suitable as an insulating medium for conductors carrying radio frequency currents. As examples of such uses my new glasses are particularly suitable for the insulating laminae in electrical condensers and for sealing iron conductors into tubes and envelopes of electronic devices. Mica, which has heretofore been used for insulating such condensers, is very expensive and requires considerable selection to insure suitable uniformity in quality. Glass, on the other hand, can be manufactured relatively cheaply and with great uniformity in composition and properties. However, no glass has heretofore been devised which combines the desired characteristics to the extent that does the glass to be hereinafter described.

The desired characteristics are:

A power factor less than .06%, as measured at a frequency of one megacycle at room temperature. The power factor of dielectrics employed in high frequency circuits is very important and with radio frequencies the power loss is objectionably large unless the power factor is as low as .06% or less.

A dielectric constant of at least 7 or 8.

A temperature coefficient for dielectric constant less than 200 parts per million per degree C., is required to meet the Army-Navy specifications for fixed, mica-dielectric capacitors having extremely low power factors and adapted for use with relatively large currents. For other purposes, the temperature coefficient may be higher. By temperature coefficient is meant the rate of change of dielectric constant with change of temperature.

A softening temperature not greater than 600° C. in order to permit fusing and sealing the contiguous edges of superposed laminae of the glass without fusing intermediate metallic laminae. Softening temperature is defined in an article entitled "A method for measuring the softening temperature of glasses," by J. T. Littleton, Jour. Am. Cer. Soc., vol. 10, page 259 (1927).

A linear coefficient of thermal expansion in the neighborhood of $128 \times 10^{-7}$ is desirable for some purposes, such as, glass-to-metal seals with iron. Lower expansion coefficients are desirable for other purposes.

Any and all of these properties may easily be obtained at the sacrifice of others and many glasses are known which have low power factors but they lack one or more of the above mentioned properties and hence have not been entirely suitable for the purposes in view. The problem solved by me has been to obtain all of the desired properties in one glass.

It is commonly believed that alkali metal oxides in glass are generally detrimental to the electrical properties of the glass, such as power factor, and that they should be omitted or kept to a minimum if low power factors and other valuable electrical characteristics are to be obtained. It is also known that glasses having very high silica contents, in the neighborhood of 100% $SiO_2$, have exceptionally low power factors. Moreover, my prior researches have shown that the unusually low power factor of some alkali-free glasses can still further be lowered by the introduction of alumina. In other words, past experience indicates that high silica, low alkali and high alumina contents are conducive to low power factors. However, they also result in high softening temperatures.

I have now discovered that in certain types of glasses these generalizations do not hold true and that, contrary to expectations, the power factor of alkali-containing lead glasses is adversely affected by the presence of alumina and/or a high silica content, but not by the presence of alkali metal oxides, provided that potash, soda and lithia are all present in certain ratios. In such glasses I have found that silica in amounts more than about 50% and alumina, even in small amounts, causes an increase in the power factor and that the lowest power factors are obtained when the ratio $K_2O/Na_2O$ is about 2.3/1 and the ratio $(K_2O+Na_2O)/Li_2O$ is about 9/1. Consequently I have found that all of the above mentioned desirable properties are possessed by glasses which contain not more than about 50% $SiO_2$, less than about 60% PbO and more than about 5% total alkali metal oxides consisting of $K_2O$, $Na_2O$ and $Li_2O$ in the ratios 4 to 1.5 $K_2O/1Na_2O$ and 18 to 4 $(K_2O+Na_2O)/1Li_2O$, and which are free from $Al_2O_3$. Although the upper limit of about 50% for silica is critical, as pointed out above, the minimum is limited only by the permissible maximum percentages of lead oxide and alkali metal oxides. There is no definite upper limit for the alkali metal oxides, but on account of the approach of instability and for other practical reasons I prefer to use not more than a total of about 25% of the latter. With alkali contents from about 17% to about 21% glasses having very high expansion coefficients and low power factors can be produced which are particularly suitable for forming glass-to-metal seals with iron. Although the presence of small amounts of boric oxide does no harm, there is no advantage to be gained, except for lowering the expansion coefficient. Oxides of metals of the second periodic group should be absent. If desired, the power factor and softening temperature can be lowered somewhat further by the introduction of fluorine, preferably as an alkali fluoride.

To illustrate the critical effect of silica and alumina on the power factors of my new glasses, the following comparative compositions were prepared and measured and are shown in Table I below. Glass A represents an alkali-lead glass containing a small excess of silica and a small percentage of alumina and having a relatively high power factor. In glass B the silica has been decreased by 10% to somewhat less than 50% and the power factor was thereby lowered by an amount equal to 25% of its original value. In glass C the omission of alumina brought about a further lowering of the power factor by another 7%.

Table I

|  | A | B | C |
|---|---|---|---|
|  | Per cent | Per cent | Per cent |
| $SiO_2$ | 56.0 | 46.0 | 47.5 |
| PbO | 30.0 | 40.0 | 40.0 |
| $K_2O$ | 8.2 | 8.2 | 8.2 |
| $Na_2O$ | 3.5 | 3.5 | 3.5 |
| $Li_2O$ | .8 | .8 | .8 |
| $Al_2O_3$ | 1.5 | 1.5 | --- |
| Power Factor | .075 | .056 | .051 |

In Table II examples of glasses falling within my invention and calculated in per cent by weight from their respective batches, together with their properties, are given:

Table II

|  | 1 | 2 | 3 | 4 | 5 | 6 | 7 |
|---|---|---|---|---|---|---|---|
| $SiO_2$ | 40.0 | 40.0 | 40.0 | 39.5 | 43.2 | 42.0 | 50.0 |
| PbO | 50.0 | 50.0 | 50.0 | 49.3 | 43.9 | 40.0 | 30.0 |
| $K_2O$ | 6.3 | 5.6 | 6.65 | 6.2 | 8.6 | 11.5 | 12.9 |
| $Na_2O$ | 2.7 | 2.4 | 2.85 | 2.0 | 3.5 | 5.0 | 5.6 |
| $Li_2O$ | 1.0 | 2.0 | .5 | 1.0 | .8 | 1.5 | 1.5 |
| $Na_2SiF_6$ |  |  |  | 2.0 |  |  |  |
| Power Factor, per cent | .046 | .051 | .050 | .042 | .046 | .046 | .054 |
| Dielectric Constant | 8.2 | 8.3 | 8.2 | 8.2 | 8.1 | 8.3 | 7.68 |
| Temperature Coefficient, P. P. M. per °C | 135 | 135 | 135 | 135 |  |  |  |
| Softening Temperature, °C | 521 | 506 | 534 | 505 |  | 503 | 521 |
| Expansion Coef. $\times 10^7$ | 103 | 104 | 103 | 102 |  | 128 | 122 |

About 1% of $Sb_2O_3$ was introduced into the batches for the purpose of fining the glasses. This had no substantial effect on their properties. The values for power factor were measured by the method known as ASTM D-150-42T, set forth on page 1148 et seq., part III of the ASTM Standards for 1942.

It will be noted that the power factors of the above glasses are substantially below .06% and that their other properties are also suitable for the purposes set forth above. Glass 4 illustrates the effect of adding fluorine to glass 1. It will be noted that the power factor and the softening point were thereby substantially reduced. Glasses 1 to 4 are particularly suitable for insulating laminae in lieu of mica in large current, fixed condensers or capacitors. Glass 6, which has an expansion coefficient near that of iron is particularly useful as an iron-sealing glass in the manufacture of glass-to-metal seals.

I claim:

1. A glass having a power factor less than .06%, a dielectric constant of at least 7 and a softening temperature less than 600° C., which, as calculated from its batch, contains not more than about 50% $SiO_2$, less than about 60% PbO and more than about 5% total alkali metal oxides consisting of $K_2O$, $Na_2O$ and $Li_2O$, in the ratio 4 to 1.5 $K_2O/1Na_2O$ and 18 to 4 $(K_2O+Na_2O)/1Li_2O$, is substantially free from $Al_2O_3$ and is free of oxides of metals of the second periodic group.

2. A glass having a power factor less than .06%, a dielectric constant of at least 7 and a softening temperature less than 600° C. which, as calculated from its batch, consists essentially of $SiO_2$, PbO, $K_2O$, $Na_2O$ and $Li_2O$, the $SiO_2$ being less than about 50%, PbO being less than about 60%, the total alkali metal oxides being more than about 5%, the ratio $K_2O/Na_2O$ being from 4/1 to 1.5/1 and the ratio $(K_2O+Na_2O)/Li_2O$ being from 18/1 to 4/1, and which is free of oxides of metals of the second periodic group.

3. A glass having a power factor less than .06%, a dielectric constant of at least 7 and softening temperature less than 600° C., which, as calculated from its batch, comprises not more than about 50% $SiO_2$, less than about 60% PbO and more than about 5% total alkali metal oxides consisting of $K_2O$, $Na_2O$ and $Li_2O$ in the ratio of about 2.3 $K_2O/1Na_2O$ and about $$9(K_2O+Na_2O)/1Li_2O,$$

is substantially free from $Al_2O_3$ and is free of oxides of the metals of the second periodic group.

4. A glass having a power factor less than .06%, a dielectric constant of at least 7 and softening temperature less than 600° C., which, as calculated from its batch, consists essentially of $SiO_2$, PbO, $K_2O$, $Na_2O$ and $Li_2O$, the $SiO_2$ being less than about 50%, PbO being less than about 60%, the total alkali metal oxides being more than about 5%, the ratio $K_2O/Na_2O$ being about 2.3/1 and the ratio $(K_2O+Na_2O)/Li_2O$ being about 9/1, and which is free of oxides of metals of the second periodic group.

5. A glass having a power factor less than .06%, a dielectric constant of at least 7 and softening temperature less than 600° C., which, as calculated from its batch, consists essentially of $SiO_2$, PbO, $K_2O$, $Na_2O$ and $Li_2O$, the $SiO_2$ being less than about 50%, PbO being less than about 60%, the total alkali metal oxides being from about 17% to about 21%, the ratio $K_2O/Na_2O$ being about 4/1 to 1.5/1, and the ratio $(K_2O+Na_2O)/Li_2O$ being about 18/1 to 4/1.

6. A glass having a power factor less than .06%, a dielectric constant of at least 7 and a softening temperature less than 600° C., which, as calculated from its batch, contains from about 40% to 50% $SiO_2$, less than about 60% PbO and more than about 5% total alkali metal oxides consisting of $K_2O$, $Na_2O$ and $Li_2O$, in the ratio 4 to 1.5 $K_2O/1Na_2O$ and 18 to 4 $(K_2O+Na_2O)/1Li_2O$, is substantially free from $Al_2O_3$, and is free of oxides of metals of the second periodic group.

7. A glass having a power factor about .046% which, as calculated from its batch, consists approximately of 40% $SiO_2$, 50% PbO, 6.3% $K_2O$, 2.7% $Na_2O$, and 1% $Li_2O$.

8. A glass having a power factor about .046% and an expansion coefficient about $128 \times 10^{-7}$, which, as calculated from its batch, consists approximately of 42% $SiO_2$, 40% PbO, 11.5% $K_2O$, 5% $Na_2O$, and 1.5% $Li_2O$.

9. A glass having a power factor less than .06%, a dielectric constant of at least 7 and a softening temperature less than 600° C. which, as calculated from its batch, contains about 40% $SiO_2$, less than about 60% PbO and more than about 5% total alkali metal oxides consisting of $K_2O$, $Na_2O$ and $Li_2O$ in the ratio of about 4 to 1.5 $K_2O/1Na_2O$ and 18 to 4 $(K_2O+Na_2O)/1Li_2O$, is substantially free from $Al_2O_3$ and is free of oxides of metals of the second periodic group.

10. A glass having a power factor less than .06%, a dielectric constant of at least 7 and a softening temperature less than 600° C. which, as calculated from its batch, contains not more than about 50% $SiO_2$, less than about 60% PbO and more than about 17% total alkali metal oxides consisting of $K_2O$, $Na_2O$ and $Li_2O$ in the ratio of about 4 to 1.5 $K_2O/1Na_2O$ and 18 to 4 $(K_2O+Na_2O)/1Li_2O$, is substantially free from $Al_2O_3$ and is free of oxides of metals of the second periodic group.

WILLIAM H. ARMISTEAD, Jr.

REFERENCES CITED

The following references are of record in the file of this patent:

UNITED STATES PATENTS

| Number | Name | Date |
|---|---|---|
| 2,278,868 | Deyrup | Apr. 7, 1942 |
| 2,018,816 | Taylor | Oct. 29, 1935 |
| 2,018,817 | Taylor | Oct. 29, 1935 |

FOREIGN PATENTS

| Number | Country | Date |
|---|---|---|
| 233,295 | Great Britain | 1925 |